United States Patent [19]
Farler et al.

[11] 4,105,898
[45] Aug. 8, 1978

[54] MULTI-BEAM LIGHT SWITCH

[76] Inventors: Buist A. Farler, 568 Brewer Dr., Nashville, Tenn. 37211; Billy F. Vanderpool, 112 Fairway Dr., Nashville, Tenn. 37214

[21] Appl. No.: 614,970

[22] Filed: Sep. 19, 1975

[51] Int. Cl.² .................. B62D 45/00; H02G 3/00
[52] U.S. Cl. .................. 307/10 LS; 315/82; 315/83
[58] Field of Search .............. 307/10 LS; 315/82, 83; 339/19, 32 R, 32 M, 33, 153, 154 R, 154 A, 155, 156

[56] References Cited
U.S. PATENT DOCUMENTS 3,364,385  1/1968  Yatcko ................................ 315/83
3,369,147  1/1968  Ramsey ........................ 307/10 LS
3,373,311  3/1968  Nuelinger ............................ 315/83

*Primary Examiner*—David Smith, Jr.
*Attorney, Agent, or Firm*—C. Claborne Carter

[57] ABSTRACT

An electrical adaptor to be installed in a motor vehicle headlight system between the standard headlight connector and the standard two position dimmer switch, having a body of insulating material, means for engaging the headlight connector, means for receiving the dimmer switch, and energizing circuit means, whereby the low beam filaments of the headlights are illuminated in the low beam position of the dimmer switch and the low and high beam filaments of the headlights are simultaneously illuminated in the high beam position of the dimmer switch.

5 Claims, 6 Drawing Figures

MULTI-BEAM LIGHT SWITCH

BACKGROUND AND SUMMARY OF THE INVENTION

The present invention is a device for a vehicle headlight system that employs at least one pair of properly spaced and adjusted headlamps mounted on the front fender of a vehicle and operable in a first or low beam condition to produce low beam illumination and switching to a second or high beam condition to add simultaneously high beam illumination of the second pair. This device is equally applicable to quadribeam and two lamp headlight systems, and eliminates the need of prior art devices for a switch mounted on the dashboard to be worked simultaneously with the dimmer switch. Instead the desired result is acquired by a dimmer switch adaptor which simply plugs into the existing foot operated dimmer switch.

The present invention relates to an automobile headlamp system and especially to a multi-beam system in which greater highway illumination under all driving conditions is obtained. By the use of a Multi-Beam Dimmer Switch Adaptor the existance of a very hazardous highway condition can be eliminated. When the headlamp of a standard motor vehicle is in the highbeam position there is a blind or blacked out area in front of and to each side of the vehicle, which is extremely dangerous when entering narrow bridges, topping hills or passing a person walking on the edge of the roadway.

It is accordingly an object of the present invention to provide an automobile headlight system wherein all beams are employed(high and low) when the dimmer switch is in the high position. This limits greatly the hazards of highway travel at night.

Another object of the present invention is the provisions of a multi-beam performance for greater illumination and a means of transferring from high position to a low position with a Multi-Beam Dimmer Switch Adaptor which in its self makes the entire change possible with out the use of any other switches or devices. When operated in the low position while in a city or meeting on coming traffic on the highway there is no danger of blinding the other motorist with excessive glare.

The foregoing objects of the present invention, together with other objects which will become obvious to those skilled in the art from the following description, are achieved by using standard size headlamps either two lamp or quadribeam together with an appropriate switching system so that a change in the beams can be made simply by pushing a dimmer switch which is connected to a Multi-Beam Dimmer Switch Adaptor for this purpose.

The present invention can be readily understood by reference to the accompanying drawings wherein.

Figure 5:
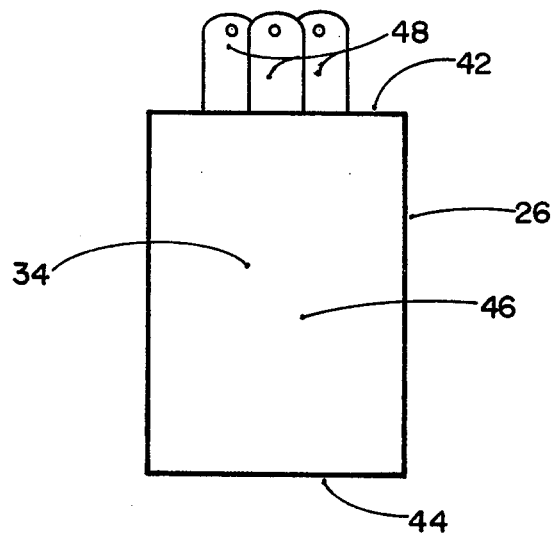
Figure 6:
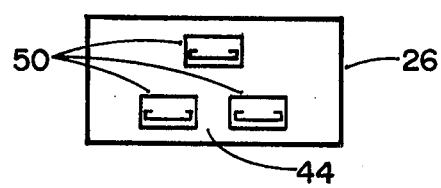

FIGS. 5 and 6 discloses an embodiment of one form of the Mulit-Beam Dimmer Switch Adaptor of the present invention.

DETAILED DESCRIPTION

Figure 1:
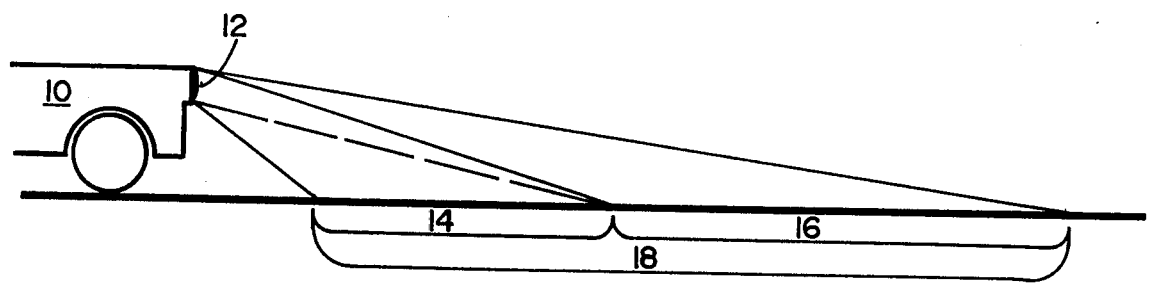
FIG. 1 is a somewhat diagrammatic perspective side view of the horziontal area illuminated by low, high and multi-beam performance.

FIG. 1 is a side view that illustrates the approximate area of highway which is illuminated when a motor vehicle 10 is using its headlights 12 in the low beam position, giving coverage 14, or in the high beam position, giving coverage 16, of a standard dimmer switch. When that same motor vehicle 10 is furnished a Multi-Beam Dimmer Switch Adaptor, the head-lights 12 will continue to yield coverage 14 in the low beam position. but will give additional coverage 18 in the high beam position of the same standard dimmer switch.

Figure 2:
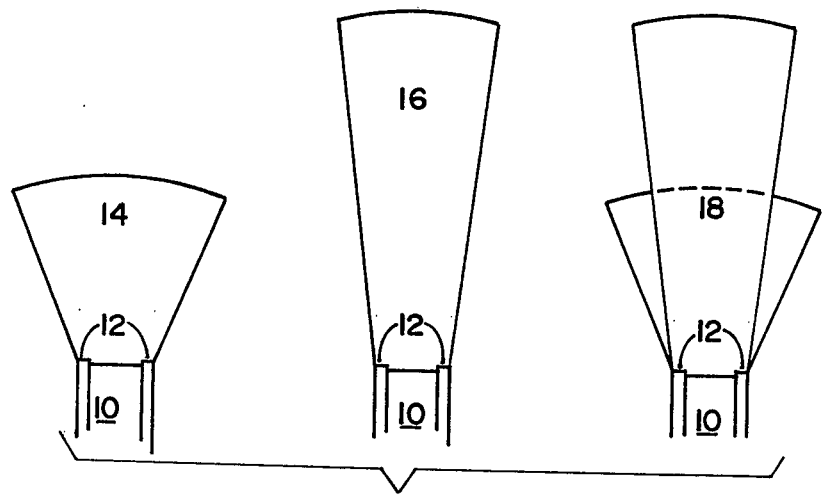
FIG. 2 is a somewhat diagrammatic perspective top view of the area of highway illuminated by low, high and multi-beam performance.

FIG. 2 is a top view showing the detail of FIG. 1 from a different perspective with like numerals referring to the same features in the respective drawings. In a standard motor vehicle 10, the approximate area in front of the motor vehicle that is illuminated when the standard dimmer switch is in the low beam position, yielding coverage 14, can be significantly increased a greater distance to the front of the motor vehicle 10, by simply changing the standard dimmer switch to the high beam position, yielding coverage 16. After installing a Multi-Beam Dimmer Switch Adaptor, however, an even greater area of illumination 18 can be experienced in the high beam position in front of the motor vehicle 10 while the area of coverage 14 is retained in the low beam position of the same dimmer switch.

Figure 3:
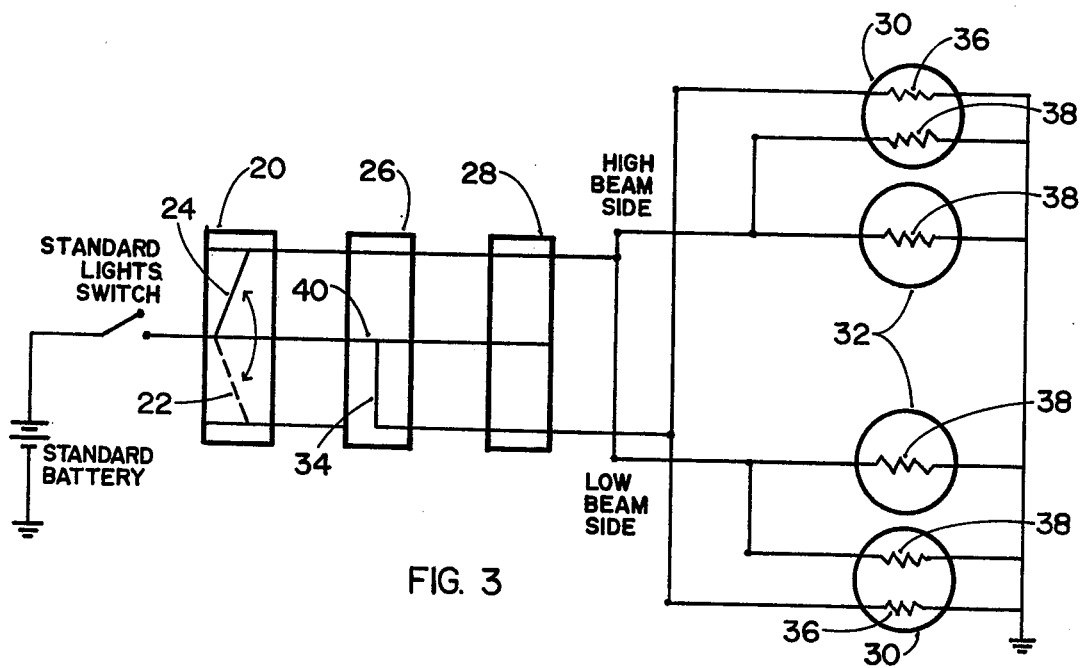
FIG. 3 is a circuit diagram for the energization and switching of the Multi-Beam Dimmer Switch Adaptor of the present invention.

Referring to FIG. 3, it will be noted that when the foot operated dimmer switch 20 is depressed or activated to the low beam side 22, yielding coverage area 14, this will illuminate the outboard sealed beams 30 on the low beam filaments 36 of said beams. When the dimmer switch 20 is depressed to the high beam side 24, yielding coverage area 18, the low beam filaments 36 of the outboard sealed beams 30 will continue to illuminate while the high beam filaments 38 of the outboard sealed beams 30, and of the inboard sealed beams 32, will be simultaneously added. This is where the present invention, the Multi-Beam Dimmer Switch Adaptor 26, is separate and distinct from any known prior art device. The present invention 26 is a plug-in adaptor containing within itself all that is necessary to produce the desired results of a multi-beam system.

Figure 4:
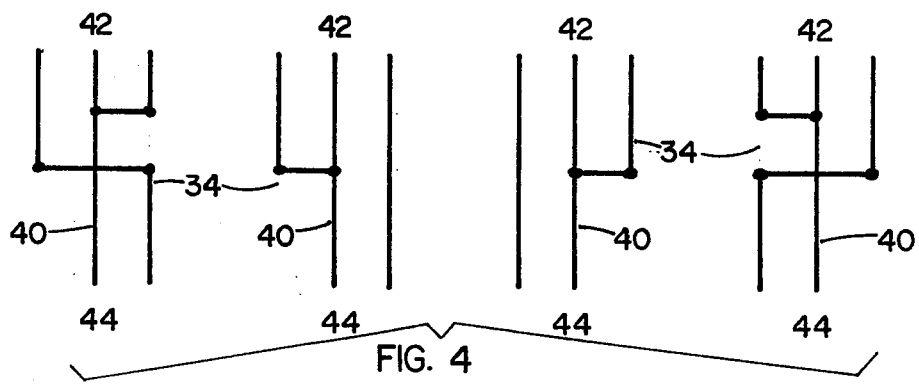
FIG. 4 is a circuit illustration of various modifications which the Multi-Beam Dimmer Switch Adaptor can take.

By wiring the Multi-Beam Dimmer Switch Adaptor 26 with energizing circuit means 34 in such a manner as to electrically connect the low beam filament 36 of the outboard sealed beam 30 to the power connection 40 within the adaptor 26, we have completed one of the four possible variations of the present invention. These variations of the energizing circuit means 34 of the present invention 26 are depicted schematically in FIG. 4. The three wires from the headlight connector 28 are engaged by the Multi-Beam Dimmer Switch Adaptor 26 on one end 42 and the energizing circuit means 34 are modified, as necessary, depending upon which of the wires from the headlight connector 38 leads to the low beam filaments 36 of the outboard sealed beam 30. The low beam lead is joined by rivet, screw, or solder to the power connection 40 of the adaptor 26 completing the energizing circuit means 34. The Multi-Beam Dimmer Switch Adaptor 26 receives on its other end 44 the input from the standard dimmer switch 20 on two wires of the energizing circuit means 34 of said adaptor. Referring specifically to FIG. 4, the energizing circuit means 34 depicted in the third circuit diagram from the left is the same energizing circuit means 34 utilized in the Multi-Beam Dimmer Switch Adaptor 26 shown in FIG. 3. By using other known devices, this result can only be accomplished by using a standard dimmer switch 20 and an extra switch mounted on the dashboard of the vehicle 10 simultaneously. The use of this additional switch is obviated by the present invention. When the foot operated dimmer switch 20 is in the high position 24, the circuit of FIG. 3 is energized by the power connection 40 of the present invention 26 direct to all four headlamps 30 and 32 at which time all six filaments 36 and 38 will become illuminated.

In use, the Multi-Beam Dimmer Switch Adaptor 26 takes the preferred form illustrated in FIG. 5. The body 46 of this plug-in switch can be molded from rubber, plastic, or other insulating material which does not conduct electricity. On one end 42 of the Multi-Beam Dimmer Switch Adaptor 26 is found three or more metal prongs 48, extending from the body, which are made of an electrical conductor such as copper, brass, or mild steel. These metal prongs 48 are received by the female receptacles in the standard headlight connector 28 of a motor vehicle 10. The geometric arrangement of these prongs 48 may be varied to fit the particular arrangement of female receptacles used by the automotive manufacturer into which the present invention is to be plugged. A triangular arrangement with each of the prongs 48 in a parallel plane is shown in FIGS. 5 and 6. Various other arrangements are possible, and it is not intended to limit the scope of the present invention to the form illustrated. Rather, all similar arrangements are included because the prong geometry is merely incidental to the performance of the Multi-Beam Dimmer Switch Adaptor 26. On the other end 44 of the Multi-Beam Dimmer Switch Adaptor 26 is found three or more metal receptacles 50 contained within the body 46, which are made of copper, brass, or mild steel. These receptacles 50 are geometrically adapted, as explained above, to receive the prongs from the standard dimmer switch 20 according to the arrangement used by the automotive manufacturer into which the present invention is to be plugged. Because the Multi-Beam Dimmer Switch Adaptor 26 is an adaptor which is inserted into the standard electrical circuit of a motor vehicle 10, it is obvious that the geometric arrangement of the prongs 48 and of the receptacles 50 on each end of its body 46 must conform to the particular arrangement of the male prongs on the standard dimmer switch 20 and the female receptacles on the standard headlight connector 28, utilized by the motor vehicle manufacturer into which the present invention 26 is to be plugged because it is only an add on device to existing equipment. Within the body 46 of the present invention 26, the male prongs 48 are connected to the female receptacles 50 by the energizing circuit means 34 as illustrated schematically in FIG. 4. Depending upon the preference of the particular automotive manufacturer into which the present invention is to be plugged, one of the four possible variations of the energizing circuit means 34 of FIG. 4 will be selected. The energizing circuit means 34 of the present invention 26 is made of an electrical conductor such as copper, brass, or mild steel in wire or strip form which are riveted, screwed, or soldered to the male prongs 48 and the female receptacles 50 at their respective ends. An optional one or more insulated support plates of electrical nonconductor material may be located within the body 46 of the present invention 26 near the ends 42 and 44, and spatially in between said ends, to give the body 46 rigidity and durability.

To install the present invention 26, one merely disconnects the standard electric circuit of a motor vehicle 10 at the junciton of the standard dimmer switch 20 and the standard headlight connector 28, and inserts therein the Multi-Beam Dimmer Switch Adaptor 26. All one has to do thereafter to use the present invention is to turn on the lights of the motor vehicle by the standard lights switch and then depress the standard dimmer switch 20 from one position to the other position as is normally done to obtain the desired amount of illumination. However, the driver of a motor vehicle utilizing the present invention will immediately experience multi-beam performance in the normal high beam position 24 of the standard dimmer switch 20.

It should be understood that the foregoing examples are merely illustrative and could be changed without departing from the scope of the present invention. While a quadribeam lamp system has been described herein, it should be apparent that the present invention would work just as well in a four filament, dual beam system.

It should be very clear from the foregoing that the present invention, the Multi-Beam Dimmer Switch Adaptor, greatly increases the safety factor for highway driving by being able to illuminate on high beam all of the filaments available at any given time then by the use of a floor operated dimmer switch connected to a Multi-Beam Dimmer Switch Adaptor, the number of illuminated filaments can be reduced to a low beam light that meets all legal requirements for city driving or when approaching on-coming traffic.

The Multi-Beam Dimmer Switch Adaptor is the first and only dimmer switch adaptor that enables an operator of a motor vehicle to use all of the headlight filaments at the same time by activating only the dimmer switch to stay within the scope of the law. This adaptor provides lighting for the area in front of the vehicle; an area that is inadequately illuminated when an automobile not equiped with this adaptor has its lights in the high beam position.

We claim as our invention:

1. An improved headlight system for motor vehicles having at least two sealed beam headlamps providing high and low beam illumination, a floor dimmer switch having at least two operable positions, energizing circuit means connected to said high beam in one position of said switch or said low beam in another position of said switch, wherein the improvement comprises:
    (a) an adaptor having a body of insulating material;
    (b) means on said body connecting said floor dimmer switch thereto;
    (c) means on said body connecting said energizing circuit means thereto; and
    (d) means in said body connecting said floor dimmer switch and said energizing circuit means to illuminate the low beam in one position of said floor dimmer switch and to illuminate both the high and low beams simultaneously in another position of said floor dimmer switch.

2. The headlight system according to claim 1 wherein the means on said body for connecting energizing circuit means thereto comprises three prongs spatially disposed from each other and from the edges of the said body.

3. The headlight system according to claim 1 wherein the means on said body for connecting the floor dimmer switch thereto comprises three receptacles spatially disposed from each other and from the edges of said body.

4. The headlight system according to claim 1 wherein the means within said body for connecting the floor dimmer switch and the energizing circuit means comprises three elongated metal conductors extending through the length of said body.

5. The headlight system according to claim 1 further including an insulated support plate within the adaptor body, spatially disposed from the ends of said body, and parallel to said ends, for receiving and supporting thereon the means within said body for connecting the energizing circuit means on said body to the means for connecting the floor dimmer switch on said body.

* * * * *